United States Patent [19]

Stommes et al.

[11] Patent Number: 5,647,396
[45] Date of Patent: *Jul. 15, 1997

[54] MODULAR VALVE POSITION INDICATOR

[75] Inventors: Wallace F. Stommes, Fergus Falls; Ross S. Kunz, Callaway; Bryan A. Beckman, Wendell; Christopher J. Kunz, Callaway, all of Minn.

[73] Assignee: StoneL Corporation, Fergus Falls, Minn.

[*] Notice: The term of this patent shall not extend beyond the expiration date of Pat. No. 5,623,963.

[21] Appl. No.: 654,268

[22] Filed: May 28, 1996

Related U.S. Application Data

[63] Continuation-in-part of Ser. No. 529,693, Sep. 18, 1995, Pat. No. 5,623,963.

[51] Int. Cl.$^6$ ..................................... E03B 7/07
[52] U.S. Cl. ............................. 137/554; 137/556
[58] Field of Search .................................. 137/552, 553, 137/554, 556

[56] References Cited

U.S. PATENT DOCUMENTS

| | | | |
|---|---|---|---|
| 3,238,968 | 3/1966 | Pecis | 137/556 |
| 4,194,529 | 3/1980 | Hargraves et al. | 137/557 |
| 4,327,768 | 5/1982 | Behle | 137/553 |
| 4,494,565 | 1/1985 | Sinclair et al. | 137/555 |
| 4,494,566 | 1/1985 | Sinclair et al. | 137/556 |
| 4,674,531 | 6/1987 | Aalto et al. | 137/556 X |
| 5,137,052 | 8/1992 | Baumgart | 137/556 |
| 5,178,187 | 1/1993 | Raymond, Jr. et al. | 137/556 |
| 5,223,822 | 6/1993 | Stommes et al. | 340/686 |
| 5,224,512 | 7/1993 | Nogami et al. | 137/554 |
| 5,277,223 | 1/1994 | Glockner et al. | 137/554 |
| 5,305,781 | 4/1994 | Raymond, Jr. et al. | 137/554 |

FOREIGN PATENT DOCUMENTS

| | | | |
|---|---|---|---|
| 0584975A1 | 2/1994 | European Pat. Off. | 137/556 |

OTHER PUBLICATIONS

Bray International, Inc. brochure on Proxsensor Valve Status Monitor (Jun. 1995).
Keystone Controls brochure on a K–Block Fixed Style Magnetic Activator to Figure 790–100/200/300 Activators (1995).
Keystone Controls brochure on a K–Block Adjustable Magnetic Activator to Figure 790–400/500 Actuators.
INDuktiv Kosten Sinken Doppelsensor Ind. brochure (no date).
Efector Inc's brochure on a Model IND proximity switch (no date).
Efector Inc's spec sheet for the Inductive Proximity Switch (no date).
VDI/VDE 3845–*Handbuch Regelungstechnik*, "Stellgerate fur stromende Stoffe", 1989, pp. 1–5.
Charles M. Simchera, *Part–Turn Valve & Actuator Standardization*, 1995, pp. 14–24.

Primary Examiner—Hoang Nguyen
Attorney, Agent, or Firm—Haugen & Nikolai, PA

[57] ABSTRACT

A modular valve position indicator which interfaces with a valve, actuator and other auxiliary equipment meeting NAMUR standards is described. The position of the valve within the flow circuit is indicated by at least one of an LED display and color coded indicia. A drum having the color coded indicia thereon, rotates through a window defined by members of the indicator in response to the rotation of the valve.

17 Claims, 7 Drawing Sheets

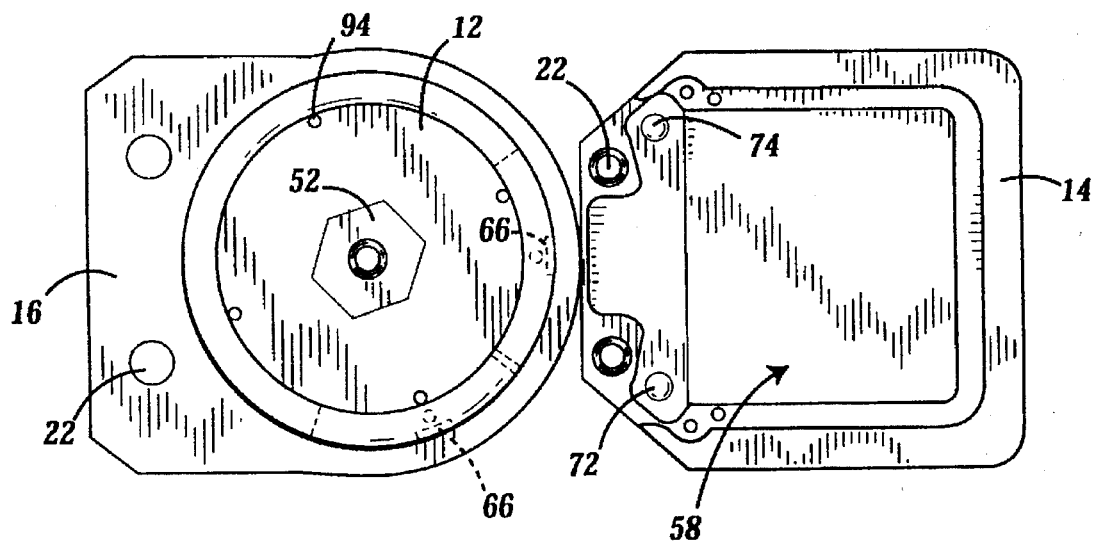
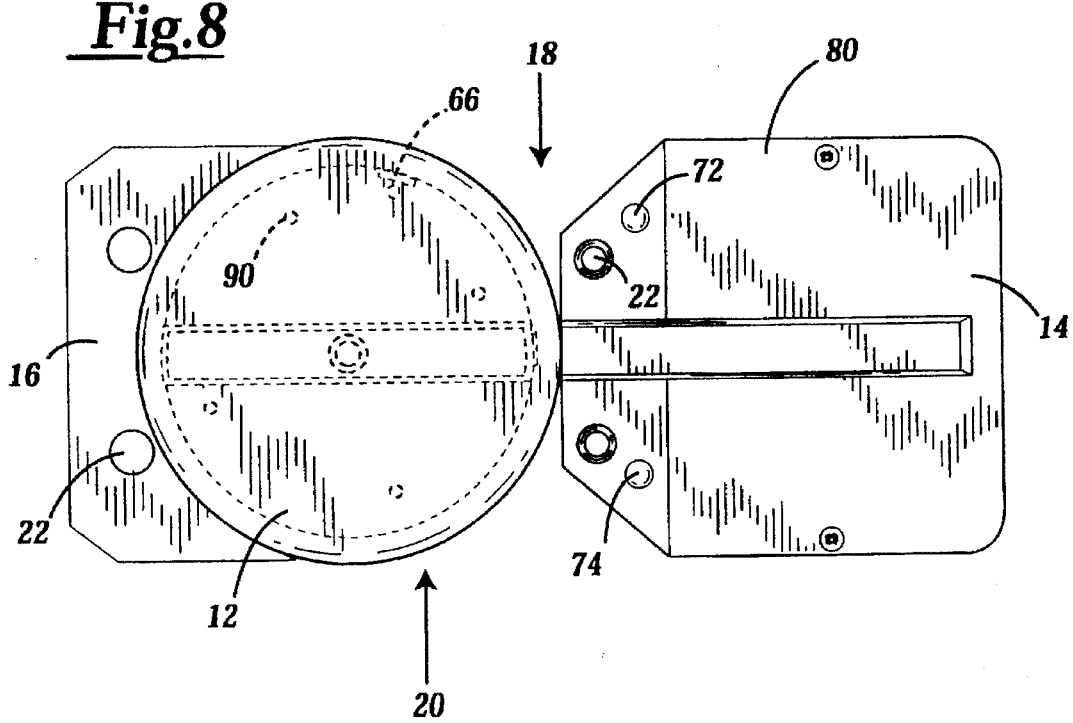

MODULAR VALVE POSITION INDICATOR

CROSS-REFERENCE TO RELATED APPLICATION

This application is a continuation-in-part of application Ser. No. 08/529,693, filed Sep. 18, 1995 and entitled MODULAR VALVE POSITION INDICATOR now U.S. Pat. No. 5,623,963.

BACKGROUND OF THE INVENTION

I. Field of the Invention

This invention relates generally to flow circuit valve position indicators, and more particularly to a modular valve position indicator compatible with international standards, which interfaces with a valve, actuator and other auxiliary equipment. A drum having color coded indicia thereon and/or position indicative target members attached thereto, rotates through a window defined by other members of the modular indicator in response to the rotation of the valve.

II. Discussion of the Related Art

Operating personnel in many industrial and laboratory settings must know, at a glance, whether a fluid-flow control valve is in an open (fluid passing) or closed (fluid blocking) disposition. A commercially available position indicator, a product of Keystone Controls, Inc., of Houston, Tex. provides a position indicator comprising one housing having electrical switches and a drum associated with the housing having cams on its external cylindrical surface cooperating with the electrical switches and a magnetic lobe contained within the drum. The position indicator is associated with the valve actuator by the magnetic lobe. The valve position is indicated by green and red LED's. Many devices have been devised for providing such an indication. In this regard, reference is made to U.S. Pat. Nos. 4,494,565; 4,494,566; 5,277,223; 4,194,529; 5,178,187; and applicant's earlier U.S. Pat. Nos. 4,962,290 and 5,273,822. Of the above related patents, only the '290, '223 and '822 patents provide an electrical signal along with the visual indication to advise personnel of the operational state of a valve to which the valve position indicator is attached.

Glockner et al. in U.S. Pat. No. 5,277,223 describes a valve position transmitter which provides both visual and electrical outputs indicative of valve position. The '223 indicator is comprised of a base, an adjusting ring, an indicator assembly, a transparent cover, switches, and cams for detecting rotation. The switches are actuated by a camming system, which are positionally mounted on sliding splines. The position of the camming system must be adjusted, to effectively actuate the switch. This adjustment increases the amount of set-up time and further increases the complexity of the valve position indicator. Therefore, a need exist for a simple and economical valve position indicator which provides both visual and electrical outputs indicative of valve position. Also, a need exists for a valve position indicator that requires fewer elements, while indicating both visually and through an electrical output, the position of the valve.

It is also apparent from an examination of the above prior art patents that the means for attaching the indicator to the valve body varies considerably and does not follow any particular interface standard. For example, J. G. Pecis, in U.S. Pat. No. 3,238,968, shows an indicator attached to the valve body using one bolt. Sinclair et al., in both the above-mentioned '565 and '566 patents, shows a mounting ring portion of the indicator having three orifices for securing the indicator to the valve body. Raymond Jr., et al., in U.S. Pat. No. 5,178,187 shows a mounting pedestal having four bores symmetrically positioned defining a square. The significance of the location of the bores is not at all clear from the disclosure.

In 1991, the Society of German Engineers and the Association of German Electrotechnicians, following the recommendations of the Standards Working Group for Instrumentation and Controls (NAMUR), promulgated a standard "VDI/VDE 3845" which defines the interfaces between rotary actuators, the fluid control valve bodies, and other accessories. VDI/VDE 3845 standardizes the height of the top mounted accessory, the position of the mounting bores, and the slot formed in the top of the actuator shaft. Thus, it is now advantageous, if not necessary for commercial marketing reasons, that valve position indicators meet these applicable international standards.

While the above prior art devices could conceivably be jury-rigged to mate with the screw hole pattern defined by the NAMUR standard, it would be advantageous to have a valve position indicator especially designed to meet this standard so that no special adapters, mounting brackets, etc. would be required.

The present invention overcomes these and other disadvantages by providing an efficient to use and economical valve position indicator conforming with NAMUR standards. The valve position indicator provides both visual and electrical outputs indicative of valve position.

SUMMARY OF THE INVENTION

The purpose of the present invention is to provide an economical, simple, modular valve position indicator which indicates, both visually and/or through electrical output, the position of the valve. The valve position indicator may also act as a termination enclosure for auxiliary components such as a solenoid valve. In the preferred embodiment the valve position indicator consists of a drum, first and second housing members, position sensors, and LED's, wherein the first and second housing members can be positioned circumferentially about the drum to provide a window for visual indication. The position sensors are electrically connected to a power supply and corresponding LED, such that when the sensor is activated, a signal is transmitted to and activates the corresponding LED. The overall height of the drum and housing members are within the NAMUR standards, and may alternatively be less than the NAMUR standard to thereby allow a second accessory to be mounted above the drum and housing if desired.

The valve position indicator components are attached to a valve's actuator shaft and to the valve body. More particularly, the drum is coupled to the actuator shaft and rotates simultaneously with the actuator shaft. The drum and actuator shaft rotate between a first position when a valve contained within the valve body is in a fluid blocking condition and a second position when the valve is in a fully open, fluid passing condition.

The first and second housing members are mounted on the valve body diametrically opposite each other relative to the drum. The first and second housing members have mounting bores through which screws can pass for attachment to the valve body, the spacing between the mounting bores conforming to NAMUR standards. When the drum is positioned between the first and second housing members, an external cylindrical surface of the drum is partially surrounded by the first and second housing members, leaving a first and second window for viewing the drum.

The drum is color coded and partitioned into four quadrants. The first and third quadrants are colored the same and likewise the second and fourth quadrants are colored the same. When the drum is rotatably positioned between the housing members, either the first and third quadrants or the second and fourth quadrants are simultaneously viewable through the first and second windows defined by the two housing members. The coloring of the drum indicates to a viewer the position of the valve within the valve body. Also, if desired, alphanumeric information can be printed on the drum as well.

In an alternate preferred embodiment, either the first or second housing may have a cavity formed therein for containing electronic circuitry used to provide an indication of valve position to a remote site. For ease of discussion, the first housing will be described as containing the electronic circuitry. First and second proximity sensors are positioned on a surface of the first housing member. Each sensor cooperates with a target member mounted on the drum. The sensors are linked to a circuit assembly, a pair of LED indicators, and a power source through a terminal junction strip. Electrically conductive wires connecting the power supply to the terminal junction strip extend through one of several conduits formed in the sides of the housing. When a target moves into proximity to a corresponding sensor, a corresponding LED indicator is illuminated.

The target members are positioned on the drums such that when the drum is rotated to a first fluid blocking position the first sensor is activated, thereby causing the first LED to be illuminated. When the drum is rotated to a second fluid passing condition, the second sensor is activated, thereby causing the second LED to be illuminated. The target members may be permanently affixed on the drum or be adjustably affixed to the drum by known means. The sensors may also be operatively coupled to a controller contained within the first housing or remotely linked, whereby the drums position may be monitored by the controller and used to transmit valve position data to a remote site.

In this embodiment the second housing may be modified to form a cover disposed around the drum, thereby isolating the moving components of the valve position indicator. The cover includes an opaque portion and a transparent portion formed diametrically opposite each other, thereby defining the window for viewing the drum. The wall thickness of the cover is thin enough to allow the first housing to be positioned adjacent the cover, such that the first and second sensors are activated when the first and second target members are rotated into proximity of the corresponding sensor.

It is accordingly a principle object of the present invention to provide a valve position indicator that indicates the position of a valve within a fluid flow circuit, both visually and/or electrically.

Another object of the present invention is to provide a valve position indicator that satisfies NAMUR standards.

Yet another object of the present invention is to provide a simple, economical, valve position indicator.

Still another object of the present invention is to provide a simple, economic, and adjustable visual indicator.

A further object of the present invention is to provide a wiring termination enclosure for terminating auxiliary equipment including solenoid valves and the like.

A still further object of the present invention is to provide a valve position indicator wherein the valve position may be monitored by a microprocessor and data associated with the position may be transmitted to a remote site.

The foregoing objects, and advantages of the present invention will be readily apparent to those skilled in the art from a review of the following detailed description of the preferred embodiment especially when considered in conjunction with the accompanying drawings.

DESCRIPTION OF THE DRAWINGS

FIG. 7 is a bottom view of a partially assembled valve position indicator of the type shown in FIG. 6;

FIG. 8 is a top view of an assembled valve position indicator of the type shown in FIG. 6.

DETAILED DESCRIPTION OF THE PREFERRED EMBODIMENT

Figure 1:
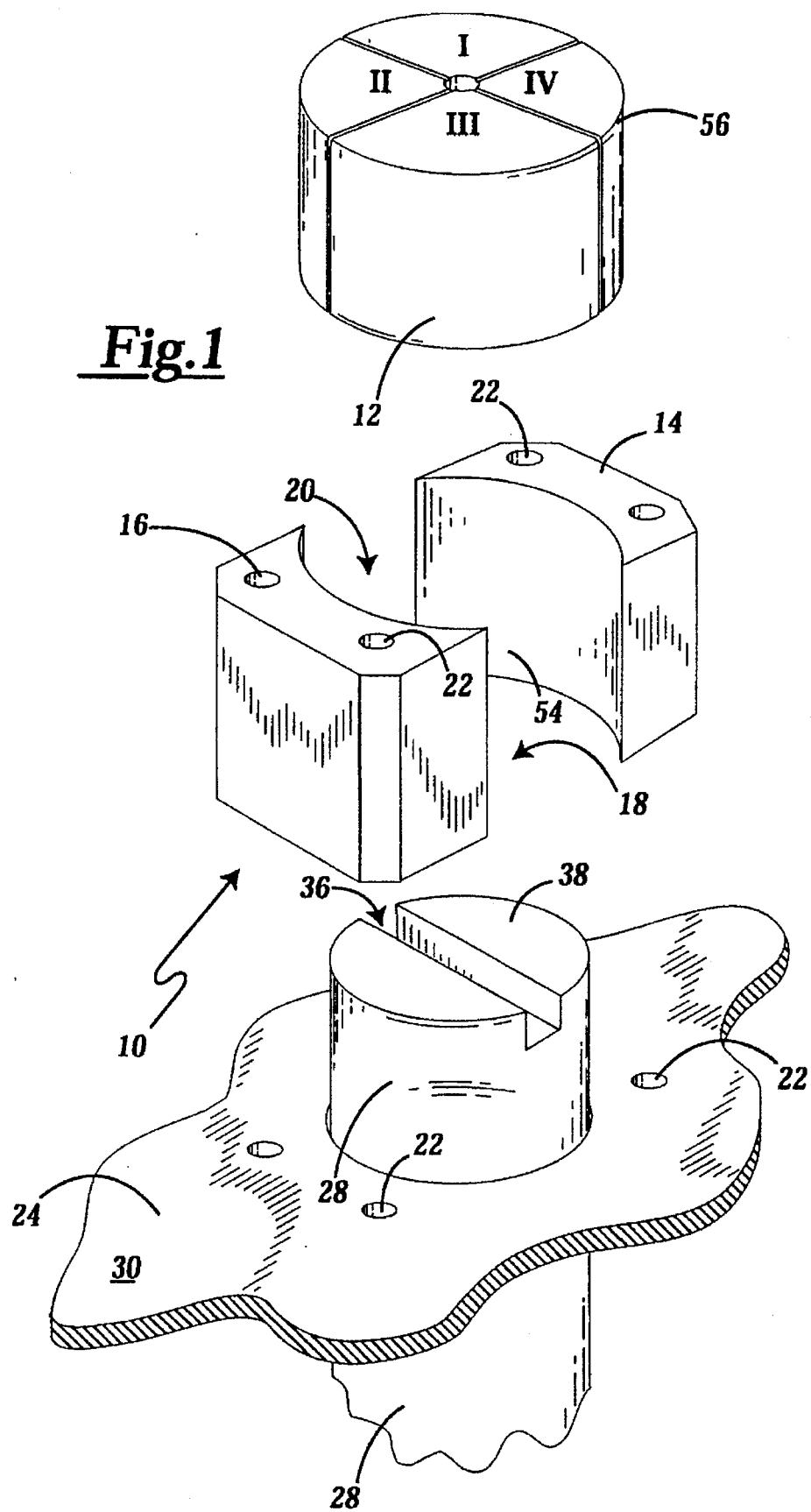
FIG. 1 is an exploded perspective view of the valve position indicator in accordance with the present invention.
Figure 2:
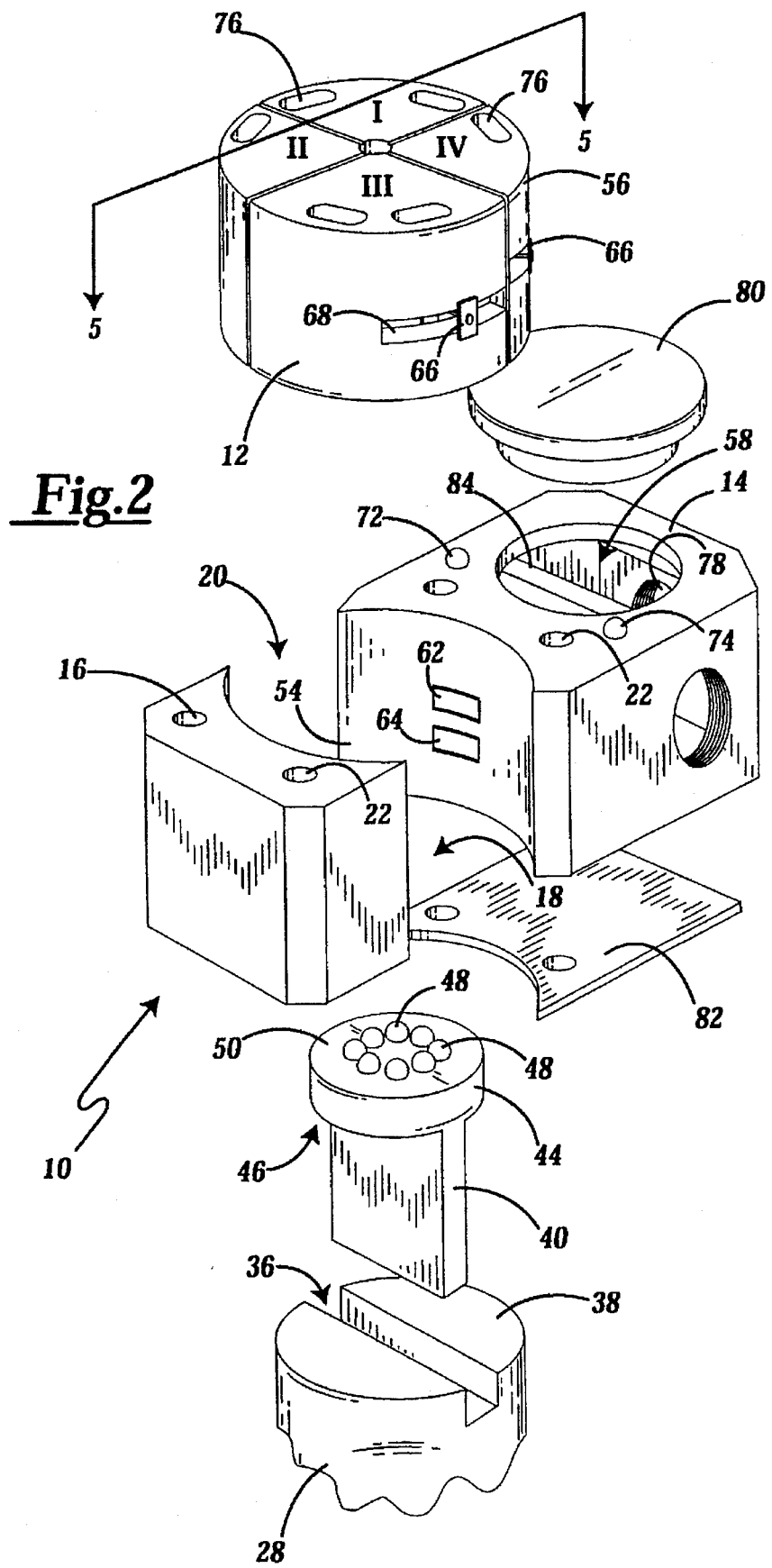
FIG. 2 is a perspective view of an alternate preferred embodiment of the valve position indicator.

Referring first to FIG. 1, the valve position indicator 10 is generally shown. It consists of a drum 12, and first and second housing members 14 and 16, wherein the first and second housing members 14 and 16 can be positioned about the drum 12 to provide first and second window areas 18 and 20 for visual indication. The overall height of the drum 12 and housings members 14 and 16 are within the NAMUR standards (between approximately 2–3 inches, 45–75 mm), and may, alternatively be less than the NAMUR standard to thereby allow a second accessory to be mounted above the drum and housing, such that the resulting overall height remains within the NAMUR standard. Screw holes 22 extending vertically through the housing members are likewise sized and spaced to comply with NAMUR standards.

The valve position indicator 10 is attached to a valve body 24, comprising a rotatable valve (not shown) contained within the valve body 24, and an actuator shaft 28 extending from the rotatable valve and projecting outwardly from a planar top surface 30 of the valve body 24. In the preferred embodiment, the rotatable valve is a quarter turn valve. The drum 12 is mounted to the actuator shaft 28 and rotates simultaneously with the actuator shaft. The drum 12 and actuator shaft 28 rotate between a first position when the rotatable valve is in a fluid blocking condition and a second position when the rotatable valve is in a fully open, fluid passing condition.

Figure 6:
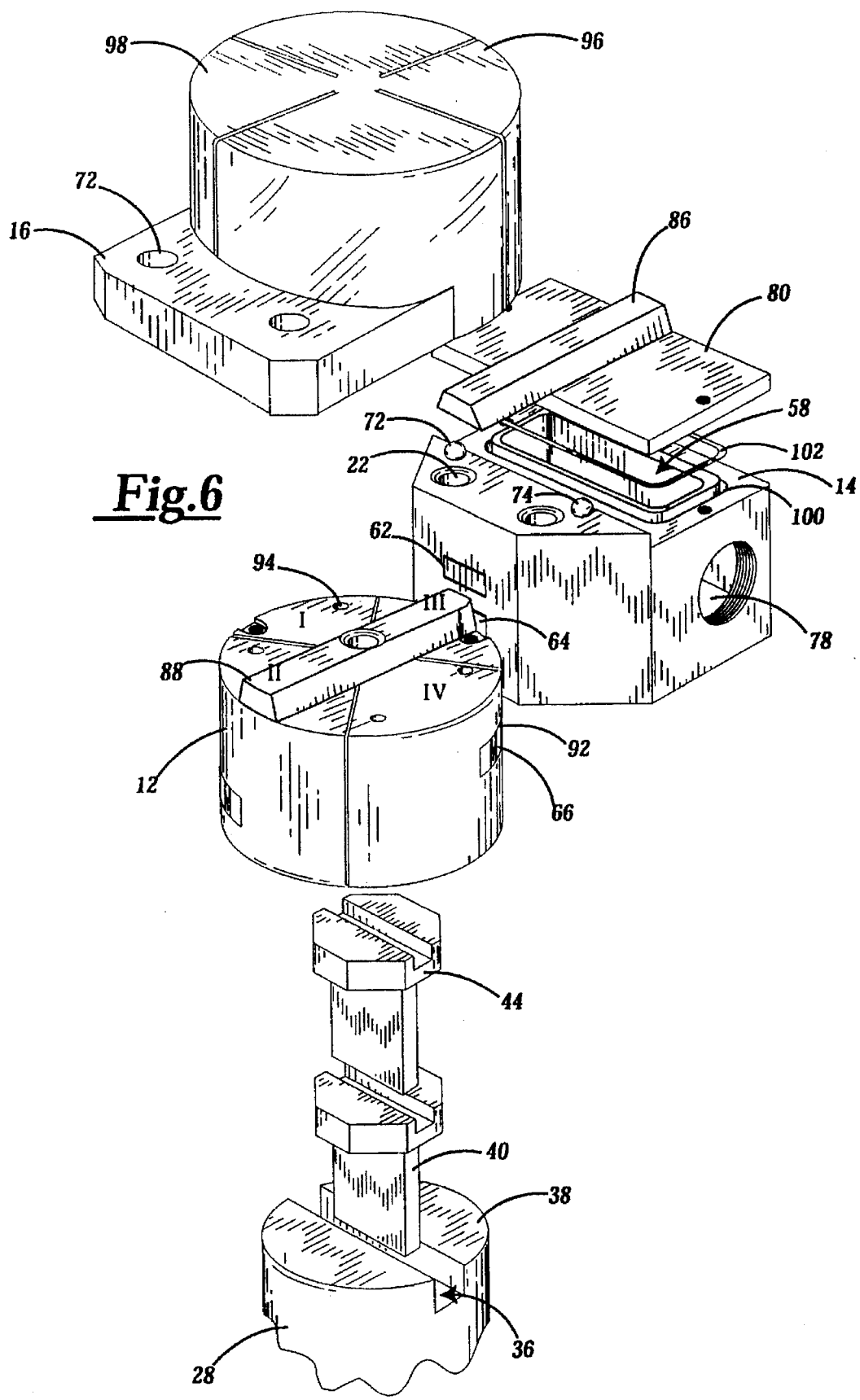
FIG. 6 is an exploded perspective view of an alternate valve position indicator in accordance with the present invention.
Figure 9:
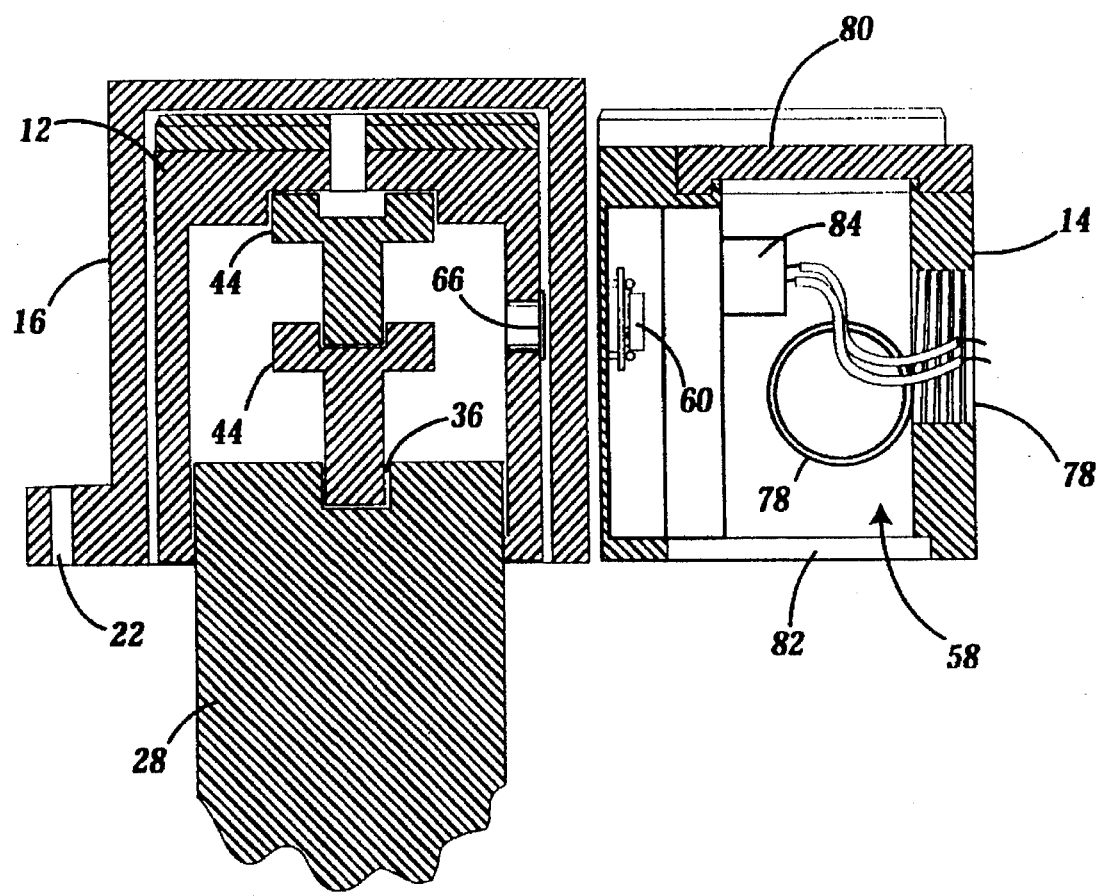
FIG. 9 is a partial sectional view of an assembled valve position indicator of the type shown in FIG. 6.

To adapt to NAMUR standards, the actuator shaft 28 may have a slot 36 formed on the end of the shaft 38. A blade 40 extending from the underside of the top surface 42 of the drum mates with the actuator shaft's slot 36, thereby locking the drum 12 into rotational engagement with the actuator shaft 28. In an alternate preferred embodiment shown in FIGS. 2–5, a cylindrical key member 44, positionable within the drum 12, has the blade 40 extending from its bottom surface 46 and keying bosses 48 extending from a top surface 50. The keying bosses 48 are positioned symmetrically on the key member 44 and mate with corresponding shaped recesses 52 formed in the underside of the top surface 42 of the drum 12. Without limitation, the keying bosses 48 may be formed in the shape of a hexagon, wherein the corresponding recesses 52 are likewise shaped in the form of a hexagon (see FIGS. 6 and 7). The keying member 44 allows the user to align and engage the drum 12 in several varying angular orientations relative to the slot 36 of the actuator shaft 28.

Figure 3:
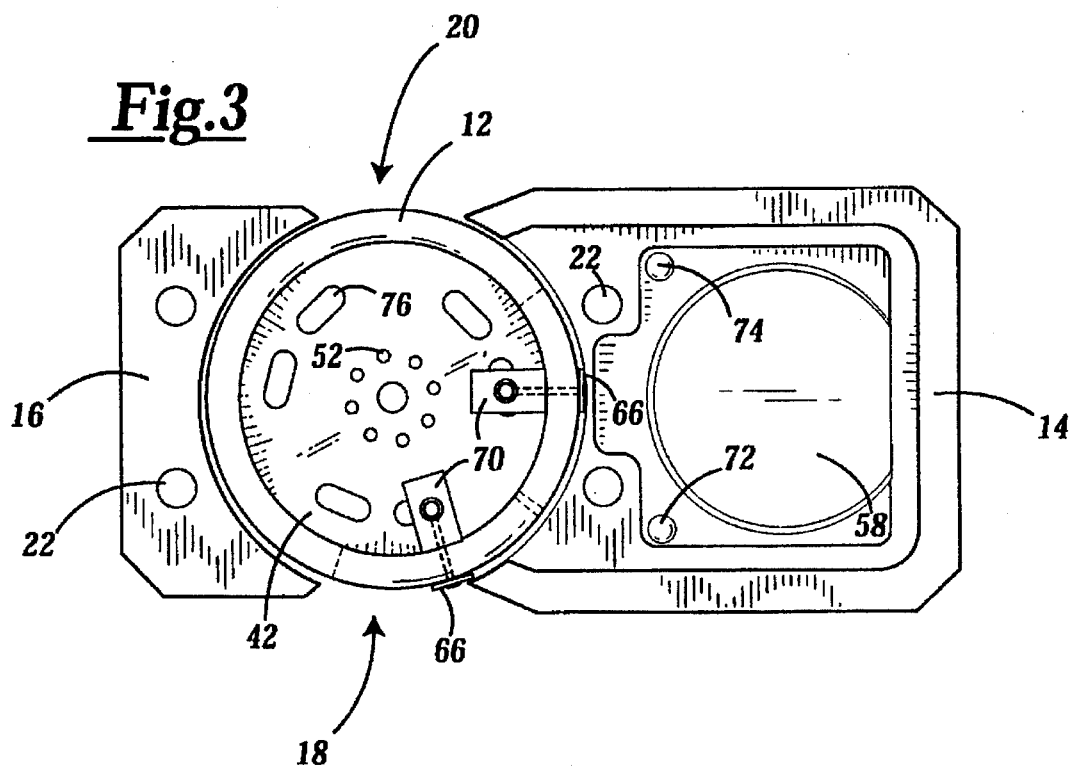
FIG. 3 is a bottom view of a partially assembled valve position indicator of the type shown in FIG. 2.
Figure 4:
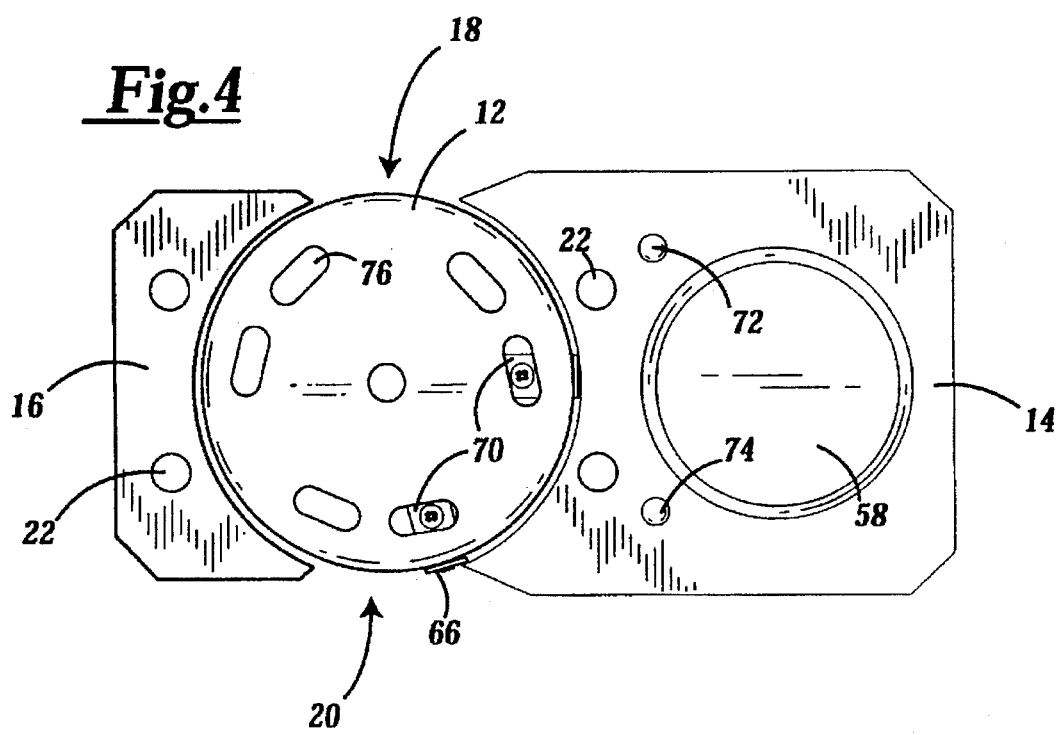
FIG. 4 is a top view of an assembled valve position indicator of the type shown in FIG. 2.
Figure 5:
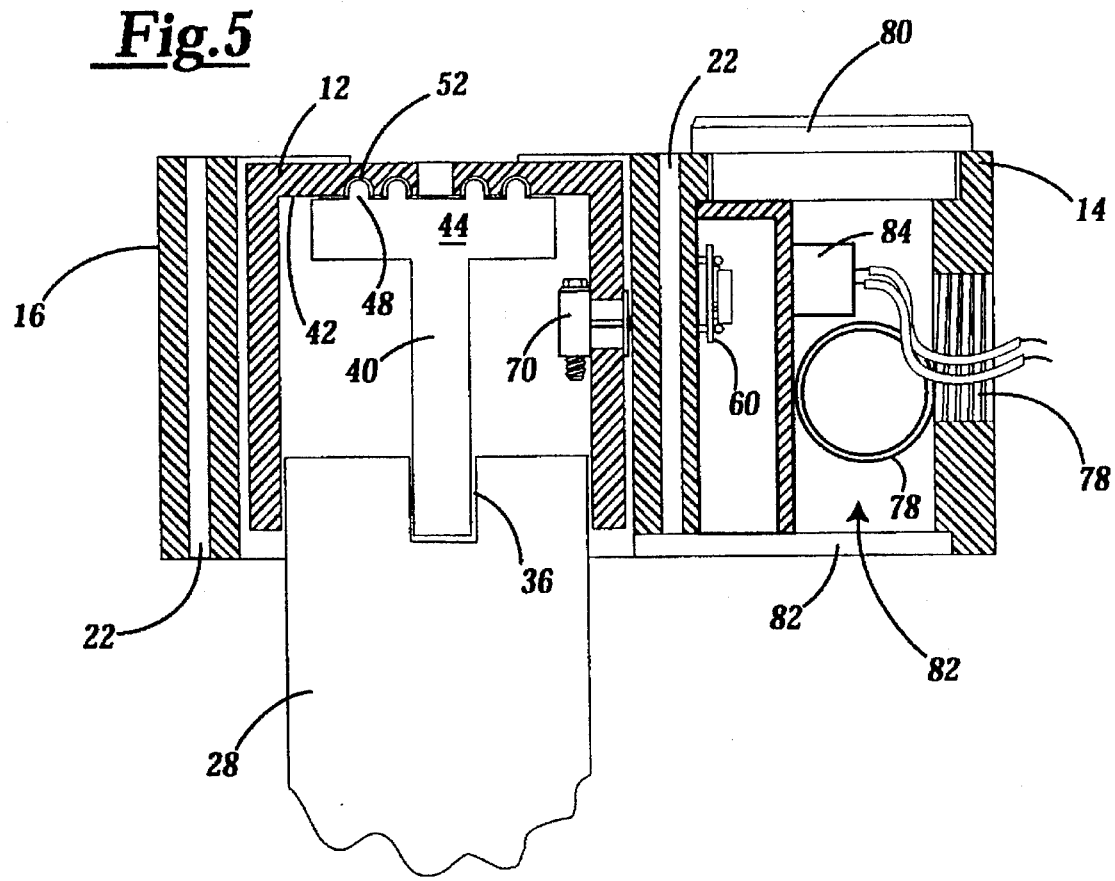
FIG. 5 is a partial sectional view of an assembled valve position indicator of the type shown in FIG. 2.

The first and second housing members 14 and 16 each have a concave, arcuate surface 54 whereby, when they are attached to the planar surface 30 of the valve body 24, the external cylindrical surface of the drum 56 is partially surrounded by the housing members, leaving the first and second window 18 and 20 for viewing the drum 12 (see FIGS. 3 and 4). As is apparent from the earlier description, the drum 12 is rotatably positioned between the housing members and the external cylindrical surface 56 of the drum. Drum 12 is partitioned into four quadrants identified by Roman numerals I-IV. The four quadrants are preferably colored with complementary colors, wherein quadrants I and III have the same color and quadrants II and IV have a complementary color. Without limitation, the first and fourth quadrants may be colored red and the second and fourth quadrants may be colored green. Hence, when the rotatable valve is in the first closed position, the red portion of the drum is visible in the windows, and when the rotatable valve is in the second open position, the green portion of the drum is visible in the windows. The colored segments assists a viewer in determining whether the rotatable valve is in the first position or second position when viewed from a distance.

Referring next to FIGS. 2-5, an alternate preferred valve position indicator 10 is shown. In this alternate preferred embodiment, either the first or the second housing member 14 or 16 has a hollow cavity 58 formed therein, to thereby contain an electronic circuit assembly 60. A top cover 80 and a bottom cover 82 sealably enclose the cavity 58 (see FIGS. 2 and 5). The circuit assembly 60 receives inputs from first and second electrical proximity sensors 62 and 64. The first and second sensors 62 and 64 are positioned on the concave arcuate surface 54 of the housing member 14. Each sensor cooperates with a target member 66 wherein the target member 66 is mounted on the cylindrical exterior surface of the drum 12. The sensors 62 and 64 are electrically linked, via an electrical terminal junction strip 84 of a type known in the art, to the circuit assembly 60 which is used to selectively energize electrically linked first and second LED indicators 72 and 74 which project through the top surface of housing member 14. When the target members 66 activate the sensors 62 or 64 the corresponding LED indicator 72 or 74 is illuminated.

The target members 66 may consist of metallic strips or any other construction for such device known to activate the associated position sensor 62 or 64 when an associated target member 66 is aligned with the sensor. The target members 66 are fastened to the drum 12 by fasteners 70 through a slot 68. The fasteners 70 slidingly adjusts along the slot 68 formed within the drum's external cylindrical surface 56. In the preferred embodiment, the alignment of the target members on the drum may be adjusted approximately 15° to accurately indicate the position of the drum in relation to the position of the rotatable valve. Apertures 76 extending through the top of the drum 12, allow the internal portion of the fastener 70 to be accessed, without requiring the removal of the drum 12 from the actuator shaft 28 (see FIG. 5) when making the initial adjustment at the time of installation. Of course, those skilled in the art will recognize that a plurality of appropriately spaced bores may replace the slots 68, wherein the target member may be centered and fastened to a selected bore with a self tapping screw.

The target members 66 are positioned on the drums 12 such that when the drum 12 is rotated to a first fluid blocking position the first sensor 62 is activated, thereby causing a LED 72 of a first color to be illuminated. When the drum 12 is rotated to a second fluid passing condition, the second sensor 64 is activated, thereby causing LED 74 of a different color to be illuminated. Without limitation, the color of the illuminated LED may correspond to the colors of the quadrant pairs visible through the windows defined by the two housing members.

The electronic circuit assembly 60 may also include a microprocessor-based controller, whereby the drum's position may be monitored by the microprocessor and used to transmit valve position information to a remote site. In this manner, both the colored drum 12 and LED indicators 72 and 74 indicate to the viewer whether the rotatable valve is in a fluid blocking or fluid passing condition, while the microprocessor may store time based information related to the changing position of the rotatable valve or other data for later transmission. The electrical wiring for providing power to the circuit assembly and for transmitting data may pass through any of a plurality of conduit fittings 78 formed in the housing 14. The electrical wiring connecting the power supply, sensors 62 and 64, LED's 72 and 74, circuit assembly 60, and optional microprocessor, connects to the electrical terminal junction strip 84 contained within the housing 14. The same electrical terminal strip 84 may have additional termination (connection) capabilities for other accessories. Should multiplexing capabilities be added, the terminal points of the electrical terminal strip 84 may be utilized as switching outputs for auxiliary devices.

FIGS. 6-9 show another alternate preferred embodiment of the valve position indicator. In this embodiment, the first and second housing members 14 and 16 are modified as further described below. The first housing 14 has a hollow cavity 58 formed therein, to thereby contain the electronic circuit assembly 60 that links the position sensors 62, 64 to corresponding LED's 72, 74 as described above. A top cap 80 and a bottom door 82 sealably enclose the cavity 58 (see FIGS. 6 and 9). The top cap 80 has a rib 86 extending from a top surface of the top cap 80. A second rib 88 extends from the top surface of the drum 12. The two ribs 86 and 88 together may be used as a visual indication of the position of the valve. For example, the ribs 86 and 88 could be aligned on the top cap 80 of housing 14 and drum 12 such that when the longitudinal axis of each of ribs 86 and 88 are parallel, this would indicate that the valve is in a fluid flowing open position and when the longitudinal axis are perpendicular, this could indicate that the valve is in a fluid blocking position.

The drum 12 is modified to eliminate apertures 76 and has instead mounting bores 90. Screws extending through mounting bores 90 fasten target members 66 to the drum 12 and are adjustable along an arcuate slot 92 formed through the cylindrical wall of drum 12. Ports 94 extend through a top portion of drum 12 and serve as drainage holes to eliminate condensation build up within the drum. As described above, the target members 66 are positioned on the drum 12 such that when the drum 12 is rotated to a first fluid blocking position the first sensor 62 is activated, thereby causing a LED 72 of a first color to be illuminated. When the drum 12 is rotated to a second fluid passing condition, the second sensor 64 is activated, thereby causing LED 74 of a different color to be illuminated. Without limitation, the color of the illuminated LED may correspond to the colors of the quadrant pairs on the drum 12 visible through a window defined by the first and second housings 14 and 16.

In this embodiment, the second housing 16 forms a cover to be disposed around the drum 12, thereby isolating the drum from direct contact. The cover 16 includes an opaque portion 96 and a transparent portion 98 formed diametrically opposite each other, thereby defining the window for viewing the drum 12. The first housing 14 may also be used to define one opaque side diametrically opposite the other opaque side of the cover 16 to thereby define the window. The wall thickness of the cover 16 is thin enough to allow the first housing 14 to be positioned adjacent the cover 16, such that the first and second sensors 62, 64 are activated when the corresponding target members 66 are rotated into proximity of the corresponding sensor.

The first and second sensors 62 and 64 are positioned on the sensing side of the housing member 14. Each sensor cooperates with a target member 66. The sensing side of the housing 14 is chamfered to reduce jutting edges and corners. Around the perimeter of the cavity 58 of the housing 14 is a groove 100 adapted for receiving a gasket 102 therein to seal the top cap 80 to the housing 14 (see FIG. 6). In a similar manner, the bottom door 82 is sealed to the housing 14, enclosing the bottom surface of the housing 14. The valve position indicators electrical components including the power supply, electrical wiring, sensors 62 and 64, LED's 72 and 74, circuit assembly 60, and terminal junction strip 84 are similar to those described above and are contained within the housing 14.

This invention has been described herein in considerable detail in order to comply with the patent statutes and to provide those skilled in the art with the information needed to apply the novel principles and to construct and use such specialized components as required. However, it is to be understood that the invention can be carried out by specifically different devices, and that various modifications, both as to the equipment details and the operating procedures, can be accomplished without departing from the scope of the invention itself.

We claim:

1. A valve position indicator for attachment to a valve body, the valve body including a shaft projecting outwardly from a planar surface and rotatable between a first position when the valve is in a fluid blocking condition and a second position when the valve is in a fully open, fluid passing condition, the valve position indicator comprising:
   (a) a visual indicator drum having an external cylindrical surface partitioned into four quadrants with the first and third quadrants of a first color and the second and fourth quadrants of a second color distinctive from the first color, said drum including a plurality of position indicative target members attached to said cylindrical surface, wherein said drum is secured to said shaft and rotatable therewith;
   (b) first and second window defining members attached to said planar surface of the valve body at locations diametrically opposite one another relative to the drum, wherein opaque portions of the first and second window defining members partially surround the drum such that the first color of the drum is exposed to view when the shaft is in its first position and the second color of the drum is exposed to view when the shaft is in its second position.

2. The valve position indicator as in claim 1, wherein the planar surface of the valve body has a plurality of mounting bores formed therein at predetermined locations specified in a NAMUR standard for interfacing the valve, shaft and auxiliary equipment, wherein the first and second window defining members are aligned with said mounting bores and attached to the valve body.

3. The valve position indicator as in claim 1, wherein said position indicative target members are radially attached on the cylindrical surface of the drum and spaced apart a predetermined distance from each other.

4. The valve position indicator as in claim 3, wherein one of the first and second window defining members includes means for sensing movement of the position indicative target members with respect to the one of the first and second window defining members as the drum moves between the first position and the second position.

5. The valve position indicator as in claim 4, and further including first and second LED indicators mounted on said one of the first and second window defining members and operatively coupled to the means for sensing movement, thereby illuminating the first and second LED indicators in relation to the rotation of the drum.

6. The valve position indicator as in claim 5, wherein the first and second LED indicators emit colors corresponding to the first and second colors of the quadrants of the drum.

7. The valve position indicator as in claim 1, and further including means for keying the visual indicator drum to the shaft of the valve body.

8. The valve position indicator as in claim 4, wherein the means for sensing movement of the position indicative target members is electrically connected to an electrical terminal junction strip.

9. The valve position indicator as in claim 4, wherein one of the first and second window defining members has at least one conduit entry opening.

10. The valve position indicator as in claim 8, wherein the electrical terminal junction strip includes termination points for connection of the means for sensing movement and termination points for connection of auxiliary equipment.

11. A valve position indicator for attachment to a valve body, the valve body including a shaft projecting outwardly from a planar surface and rotatable between a first position when the valve is in a fluid blocking condition and a second position when the valve is in a fully open, fluid passing condition, the valve position indicator comprising:
   (a) a cylindrical drum including a plurality of position indicative target members attached to a cylindrical surface of said drum, wherein said drum is secured to said shaft and rotatable therewith;
   (b) a housing attached to the planar surface of the valve body, spaced a predetermined distance from the cylindrical surface of said drum, and including sensing means contained within said housing for sensing movement of the position indicative target members relative to said housing as the valve moves between the first fluid blocking and second fully open positions; and
   (c) a terminal junction strip contained within said housing for electrically interconnecting the sensing means with a power supply and auxiliary equipment.

12. The valve position indicator as recited in claim 11, further comprising a cap disposed around said drum and attached to the planar surface of the valve body, said cap having both an opaque portion and a transparent portion, thereby defining a window for viewing said drum.

13. The valve position indicator as recited in claim 12, wherein the external cylindrical surface of said drum is partitioned into at least two sections, with the first section of a first color and the second section of a second color distinctive from the first color, whereby the first color is visible through the window when the shaft is in its first position and the second color is visible through the window when the shaft is in its second position.

14. The valve position indicator as in claim 12, wherein the planar surface of the valve body has a plurality of mounting bores formed therein at predetermined locations specified in a NAMUR standard for interfacing the valve, shaft and auxiliary equipment, wherein the housing and cover are aligned with said mounting bores and attached to the valve body.

15. The valve position indicator as in claim 11, wherein the position indicative target members are radially attached on the cylindrical surface of the drum and spaced apart a predetermined distance from each other.

16. The valve position indicator as in claim 11, and further including first and second LED indicators mounted on said housing and operatively coupled to the sensing means, thereby illuminating the first and second LED indicators in relation to the rotation of the drum.

17. The valve position indicator as in claim 16, wherein the first and second LED indicators emit colors corresponding to the first and second colors of the sections of the drum.

* * * * *